US012784484B2

(12) United States Patent
Rivera et al.

(10) Patent No.: US 12,784,484 B2
(45) Date of Patent: Nov. 3, 2026

(54) EQUIPMENT IDENTIFICATION USING COMPUTER VISION

(71) Applicant: Florida Power & Light Company, Juno Beach, FL (US)

(72) Inventors: Ricardo L. Rivera, Palm City, FL (US); Alena C Krause, Coconut Creek, FL (US); Hany F. Bassily, Oviedo, FL (US); Lorenzo Estrada, West Palm Beach, FL (US); Ashwin K. Kunduru, Wellington, FL (US); Randall R. Wagner, DePere, WI (US)

(73) Assignee: Florida Power & Light Company, Juno Beach, FL (US)

( * ) Notice: Subject to any disclaimer, the term of this patent is extended or adjusted under 35 U.S.C. 154(b) by 216 days.

(21) Appl. No.: 18/666,611

(22) Filed: May 16, 2024

(65) Prior Publication Data

US 2025/0356679 A1 Nov. 20, 2025

(51) Int. Cl.

*G06V 30/194* (2022.01)
*G06V 10/771* (2022.01)
*G06V 30/19* (2022.01)

(52) U.S. Cl.

CPC .......... *G06V 30/194* (2022.01); *G06V 10/771* (2022.01); *G06V 30/19093* (2022.01); *G06V 30/19107* (2022.01)

(58) Field of Classification Search

CPC ...... G06V 10/771; G06V 20/63; G06V 30/10; G06V 30/19093; G06V 30/19107; G06V 30/194

See application file for complete search history.

(56) References Cited

U.S. PATENT DOCUMENTS

| | | | |
|---|---|---|---|
| 7,570,816 B2 | 8/2009 | Bargeron et al. | |
| 9,697,548 B1 | 7/2017 | Jaff et al. | |
| 10,824,899 B2 | 11/2020 | Wang et al. | |
| 2006/0197928 A1 * | 9/2006 | Hirai | G06F 16/5854 707/E17.024 |
| 2019/0340460 A1 | 11/2019 | Li et al. | |
| 2025/0005947 A1 * | 1/2025 | Delgado del Hoyo | G06V 30/19173 |

* cited by examiner

*Primary Examiner* — Ruiping Li

(74) *Attorney, Agent, or Firm* — Fish & Richardson P.C.

(57) ABSTRACT

Employing computer vision to verify equipment is discussed. One example method includes receiving an image comprising an equipment identifier tag and identifying text regions in the image. The method additionally includes generating a clustered text region from the text regions. The clustered text region includes a subset of the text regions. The method also includes adaptively applying an image processing algorithm to a sub-image of the image. The sub-image comprises the clustered text region and the image processing algorithm is selected from a set of image processing algorithms based on the sub-image. The method further includes generating a predicted tag identifier for the processed clustered text region. Additionally, the method includes determining a tag identifier for the equipment identifier tag based on a comparison between the predicted tag identifier for the processed clustered text region and a set of tag identifiers comprising the tag identifier.

20 Claims, 6 Drawing Sheets

EQUIPMENT IDENTIFICATION USING COMPUTER VISION

TECHNICAL FIELD

This description relates to systems and methods that use computer vision to identify equipment based on equipment identifier tags, such as for equipment maintenance.

BACKGROUND

In many scenarios, misidentification of equipment can cause significant consequences. One example scenario is maintenance of a nuclear power plant, where safe and efficient operation involves maintenance of various components. Work requests performed by staff involve equipment that may look similar to other equipment and may have a similar equipment identifier to other equipment. However, work requests mistakenly performed on incorrect equipment can potentially create a personnel safety risk or an unintended forced outage.

SUMMARY

A first example relates to a non-transitory machine-readable medium having machine executable instructions for an equipment verification system that causes a processor core to execute operations. The operations include receiving an image comprising an equipment identifier tag. The operations also include identifying a set of text regions in the image. Additionally, the operations include generating a clustered text region associated with the equipment identifier tag from the set of text regions. The clustered text region includes a subset of the set of text regions. The operations further include adaptively applying an image processing algorithm to a sub-image of the image to generate a processed clustered text region. The sub-image includes the clustered text region and the image processing algorithm is selected from a set of image processing algorithms based on the sub-image. The operations additionally include generating a predicted tag identifier for the processed clustered text region. Furthermore, the operations include determining a tag identifier for the equipment identifier tag based on a comparison between the predicted tag identifier for the processed clustered text region and a set of tag identifiers comprising the tag identifier.

A second example relates to an equipment verification system, including a memory for storing machine-readable instructions and a processor core for accessing the machine-readable instructions and executing the machine-readable instructions as operations. The operations include receiving an image comprising an equipment identifier tag. The operations also include identifying a set of text regions in the image. Additionally, the operations include generating a clustered text region associated with the equipment identifier tag from the set of text regions. The clustered text region includes a subset of the set of text regions. The operations further include adaptively applying an image processing algorithm to a sub-image of the image to generate a processed clustered text region. The sub-image includes the clustered text region and the image processing algorithm is selected from a set of image processing algorithms based on the sub-image. The operations additionally include generating a predicted tag identifier for the processed clustered text region. Furthermore, the operations include determining a tag identifier for the equipment identifier tag based on a comparison between the predicted tag identifier for the processed clustered text region and a set of tag identifiers comprising the tag identifier.

A third example relates to a method for equipment verification. The method includes receiving an image comprising an equipment identifier tag. The method also includes identifying a set of text regions in the image. Additionally, the method includes generating a clustered text region associated with the equipment identifier tag from the set of text regions. The clustered text region includes a subset of the set of text regions. The method further includes adaptively applying an image processing algorithm to a sub-image of the image to generate a processed clustered text region. The sub-image includes the clustered text region and the image processing algorithm is selected from a set of image processing algorithms based on the sub-image. The method additionally includes generating a predicted tag identifier for the processed clustered text region. Furthermore, the method includes determining a tag identifier for the equipment identifier tag based on a comparison between the predicted tag identifier for the processed clustered text region and a set of tag identifiers comprising the tag identifier.

DETAILED DESCRIPTION

Various examples described herein process images of equipment identifier tags captured on site in order to extract text from those images, including the equipment identifier tags. In various examples, a trained machine learning model identifies an equipment identifier tag in the image. Examples apply adaptive filters to text on the identified equipment identifier tag. Examples also employ optical character recognition (OCR) to generate a predicted text, which various examples verify by comparison with a database of tag identifiers and/or a target tag identifier of a work order.

Figure 1:
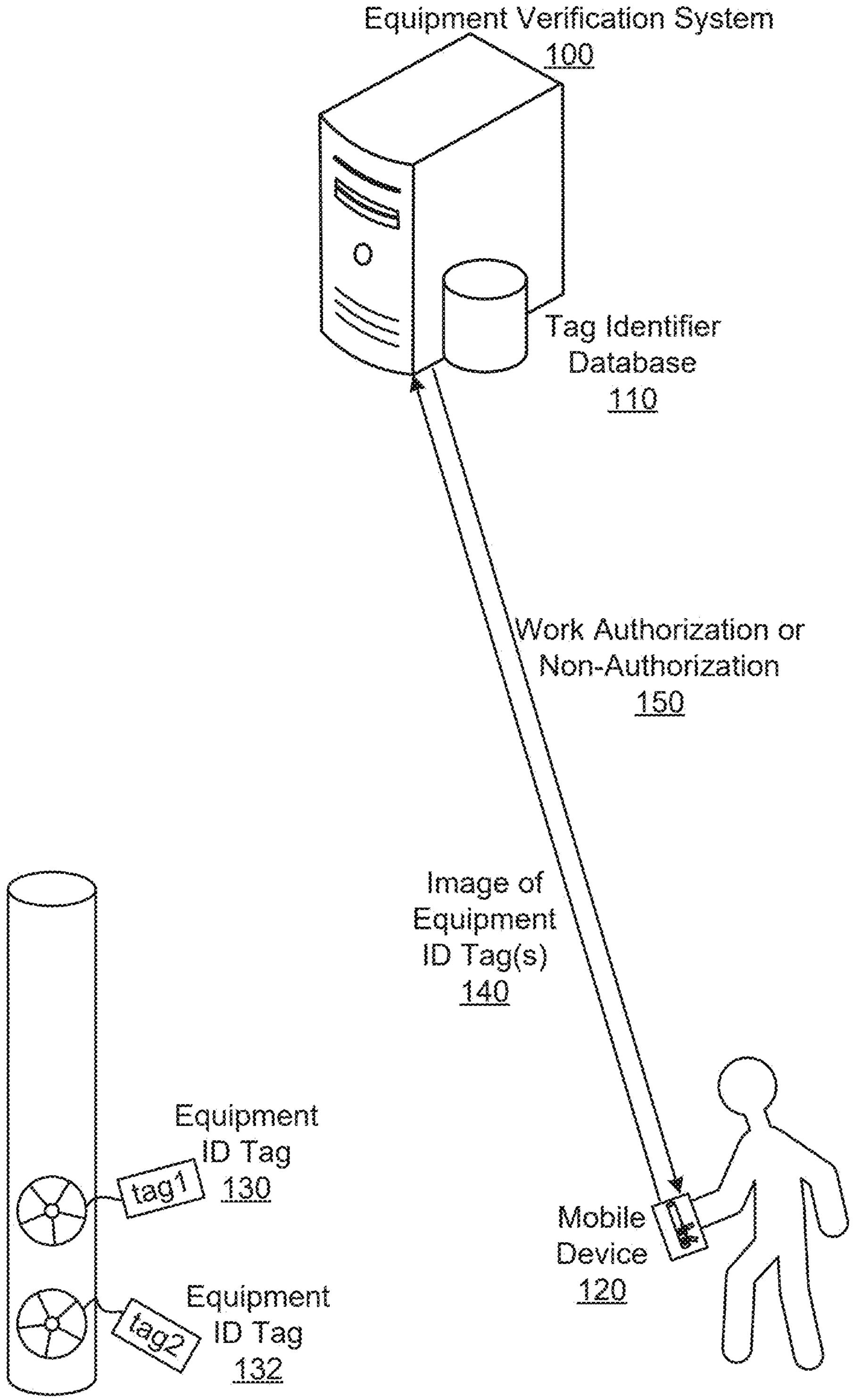
FIG. 1 illustrates a diagram showing an equipment verification system that employs computer vision to determine a tag identifier associated with an image of an equipment identifier tag.

Referring to FIG. 1, illustrated is a diagram showing an equipment verification system 100 that employs computer vision to determine a tag identifier associated with an image of an equipment identifier tag. In various examples, the determined tag identifier is compared with a target tag identifier of a work order and/or a set of tag identifiers in a tag identifier database 110.

In various scenarios, a user takes an image (e.g., via a mobile device 120) of one or more equipment identifier tags of equipment, such as example equipment identifier tags 130 and 132 of FIG. 1. One example scenario involves a work order for a target identifier tag, where the user believes at least one of the equipment identifier tags in the image is potentially a target equipment identifier tag of equipment associated with a work order (e.g., for maintenance, etc.). In some scenarios, the image includes a single equipment identifier tag, while in other scenarios the image contains multiple equipment identifier tags (e.g., as in FIG. 1), for example where multiple equipment identifier tags are believed to potentially be the target equipment identifier tag, where one or more additional tags were unintentionally included in an image of an equipment identifier tag believed to potentially be the target equipment identifier tag, etc.

The image of the equipment identifier tag(s) is transmitted at 140 to the equipment verification system 100. The equipment verification system 100 analyzes the image to identify the equipment identifier tag(s) (e.g., the equipment identifier tags 130 and 132) in the image and determines the tag identifier(s) of the equipment identifier tag(s). In various examples, the equipment verification system 100 compares the determined tag identifier(s) to a target tag identifier (e.g., associated with a work order) and/or a set of tag identifiers stored in the tag identifier database 110. In various examples, based on a comparison between the determined tag identifier(s) and the target tag identifier of the work order, the equipment verification system 100 determines whether the target tag identifier is in the image. Based on whether the image includes the target tag identifier, the equipment verification system 100 transmits an indication of whether or not to proceed with the work order (e.g., an authorization to perform the work order if the image includes the target tag identifier or a non-authorization indicating not to perform the work order if the image does not include the target tag identifier).

Figure 2:
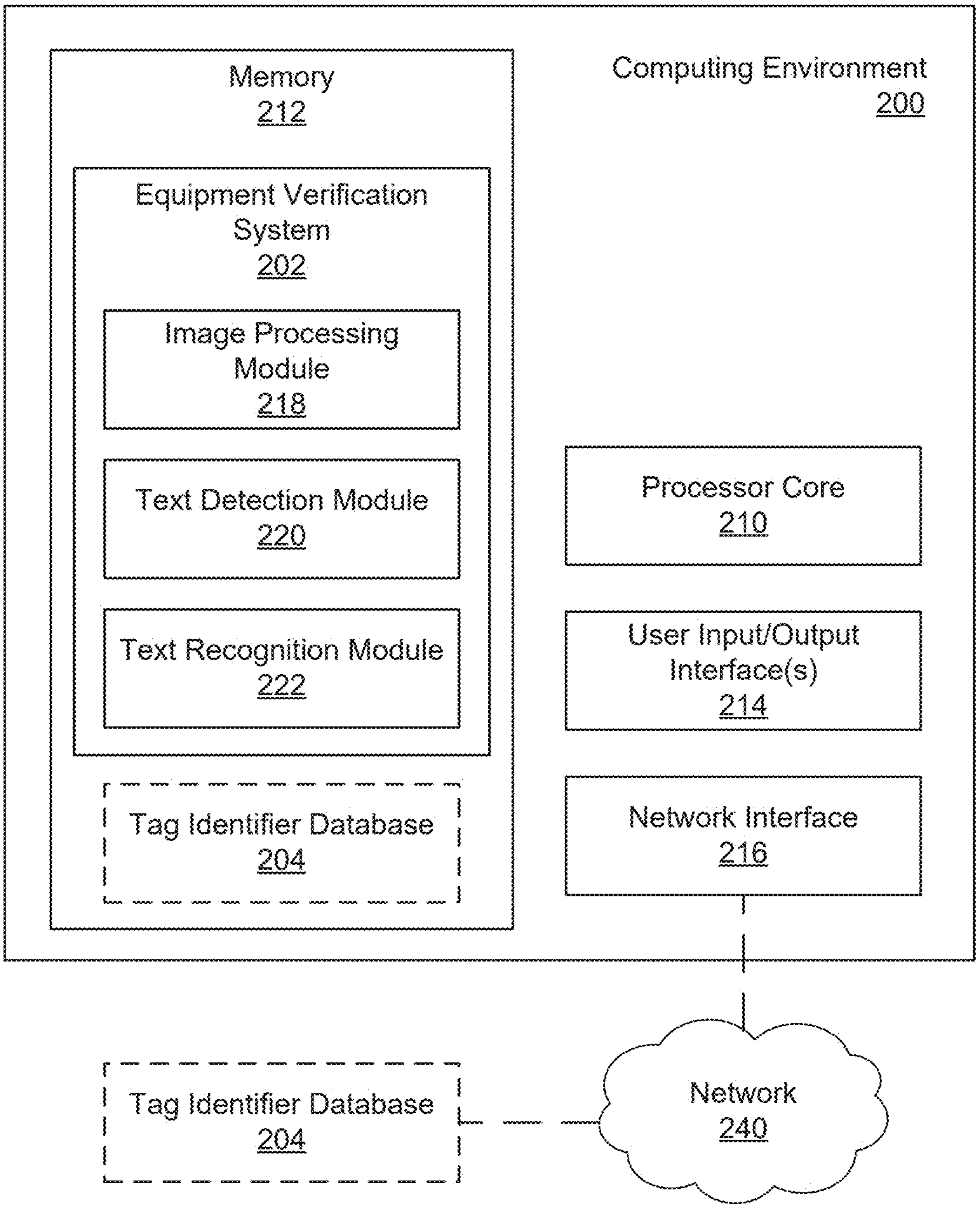
FIG. 2 illustrates an example computing environment for an equipment verification system.

Referring to FIG. 2, illustrated is an example computing environment 200 implementing an equipment verification system 202 (e.g., which in various examples is the equipment verification system 100) capable of determining one or more tag identifiers in an image and/or verifying whether the image includes a target tag identifier associated with a work order, based on comparison of the tag identifiers of the image with a set of tag identifiers stored in a tag identifier database 204 (e.g., which in various examples is the tag identifier database 110) and/or a target tag identifier (e.g., which in various examples is within the set of tag identifiers stored in the tag identifier database 204.

The computing environment 200 includes a processor core 210, a memory 212, a user input/output (I/O) interface 214, and a network interface 216, which are operably connected for computer communication. The processor core 210 performs general computing to execute instructions stored in the memory 212, including instructions associated with equipment verification system 100. The instructions cause the processor core 210 to execute operations. The memory 212 also stores instructions associated with an operating system that controls and/or allocates resources of the computing environment 200, including resources associated with equipment verification system 202. The memory 212 represents a non-transitory machine-readable memory (or other medium), such as random access memory (RAM), a solid state drive, a hard disk drive or a combination thereof.

The equipment verification system 202 includes an image processing module 218, a text detection modulation 220 and a text recognition module 220. The memory 212 stores machine-readable instructions associated with modules 218-222.

The processor core 210 accesses the memory 212 and executes the machine-readable instructions as operations. The processor core 210 can be a variety of various processors including multiple single- and multi-core processors, co-processors, and other multiple single and multicore processor and co-processor architectures.

A user I/O interface 214 provides software and hardware to facilitate data input and output between the computing environment 200 and a user. This can include input devices such as a keyboard, mouse, touchpad, touchscreen, microphone, etc., as well as output devices such as display(s) (e.g., light-emitting diode (LED) display panel(s), liquid crystal display (LCD) panel(s), plasma display panel(s), and/or touch screen display(s), etc.), speaker(s), etc. The user I/O interface 214 provides graphical input controls for a user interface, which can include software and hardware-based controls, interfaces, touch screens, or touch pads or plug and play devices for a user to provide user input.

The network interface 216 provides software and hardware to facilitate data input to (e.g., entering tag identifier(s) into the tag identifier database 204, receiving images from a user such as via mobile device 120, etc.) and output from (e.g., tag identifier(s) identified in the image, an authorization or a non-authorization to perform the work order, etc.) the computing environment 200.

The memory 212 includes the equipment verification system 100 that includes modules 218-222 that operate in concert and/or stages to analyze an image, identify tag identifier(s) in the image, and/or indicate whether to proceed with a work order based on the image.

In various examples, the image processing module 218 accesses an image received via the network interface 216 and performs initial image processing on the image (e.g., grayscaling, etc.). Additionally, in various examples, the image processing module 218 crops the image based on clustered text regions generated by the text detection module 220 to create sub-image(s) of the clustered text region(s) associated with each equipment tag identifier. Further, in various examples, the image processing module 218 performs adaptive image processing on the sub-image(s) to facilitate text prediction by the text recognition module 222. In various examples, the image processing module 218 also employs a trained machine learning algorithm (e.g., trained based on a training set of sub-images and/or based on user feedback, etc.) to select an particular image processing algorithm (e.g., binary thresholding, grayscaling, etc.) and/or tuned image processing parameters for each sub-image. Depending on the example, the image processing algorithm employs any of a variety of machine learning algorithms (e.g., one of or an ensemble of two or more of, a logistic regression model, a Cox regression model, a Least Absolute Shrinkage and Selection Operator (LASSO) regression model, a naïve Bayes classifier, a support vector machine (SVM) with a linear kernel, a SVM with a radial basis function (RBF) kernel, a linear discriminant analysis (LDA) classifier, a quadratic discriminant analysis (QDA) classifier, a logistic regression classifier, a decision tree, a random forest, a diagonal LDA, a diagonal QDA, a neural network, an AdaBoost algorithm, an elastic net, a Gaussian process classification, or a nearest neighbors classification, etc.).

In some examples, in response to an image including two or more equipment identifier tags, the image processing module 218 determines an equipment identifier tag of the two or more equipment identifier tags to be a primary equipment identifier tag of the image based on one or more properties of the sub-images of the equipment identifier tags, such as: the size of the sub-image of the selected equipment identifier tag in the image relative to the size(s) of the sub-images of the other equipment identifier tags in the image (e.g., selecting the equipment identifier tag that occupies the largest portion of the image), the location of the sub-image of the selected equipment identifier tag in the image relative to the location(s) of the sub-image(s) of the other equipment identifier tag(s) in the image (e.g., selecting the equipment identifier tag positioned closest to the center of the image), blurriness of the sub-image of the selected equipment identifier tag relative to the sub-images of other equipment identifier tags (e.g., wherein the blurriness is quantified based on a blur detection algorithm, fast Fourier transform (blurrier images have less high frequency components), etc.). In such examples, the image processing module 218 selects the primary equipment identifier tag for text recognition and comparison to be performed by the text recognition module 222.

In some examples (e.g., sensitive equipment, etc.), the image processing module 218 also determines one or more other characteristics of the image, such as location metadata associated with the image, bar code(s) on the equipment identifier tag(s), the outline or other visual characteristics of the equipment associated with the equipment identifier tag(s), etc.

In various examples, the text detection module 220 employs a trained machine learning algorithm (e.g., a machine learning algorithm as discussed herein or an existing machine learning algorithm trained for text detection, such as OpenCV's EAST text detector, which in some examples is trained or further trained to identify text on equipment identifier tags, etc.) to identify a set of text regions in the image (e.g., after initial image processing, etc.). For each text region identified in the image, the text detection module 220 generates bounding box coordinates around the location of that detected text. Additionally, the text detection module 220 employs a clustering algorithm to group proximally close text areas (e.g., based on the bounding box coordinates) identified via text detection. The text detection module 220 provides the clustered text regions to the image processing module 218 for cropping the sub-images and performing adaptive pre-processing on the cropped sub-images.

The text recognition module 222 employs text recognition (e.g., OCR) to generate a text prediction for the equipment identifier tag(s) in the processed sub-image(s). In various examples, the text recognition module 222 filters the recognized text using text analytics (e.g., using the set of tag identifiers in the tag identifier database 204 and/or properties of tag identifiers, etc.) to separate the potential tag identifier(s) from other recognized text and generate predicted tag identifier(s) for the processed sub-image(s). In some examples, the text of the predicted tag identifier(s) is based on user feedback, such as prior user feedback used for further training, current user feedback, etc. In various examples, the text recognition module 222 validates the predicted tag identifier against the set of tag identifiers in the tag identifier database 204 and/or a target tag identifier of the work order. In various examples, the text recognition module 222 validates the predicted tag identifier based on calculating a similarity score between the predicted tag identifier and one or more other tag identifiers (e.g., the target tag identifier associated with the work order, etc.). Different methods of calculating the similarity score are employable by the text recognition module 222 in various examples, such as a ratio of matching characters to total characters, methods that provide some increase in similarity score to incorrect but similar characters (e.g., O and 0; I and I, etc.) compared to incorrect but dissimilar characters, etc. The text recognition module 222 provides output to a user (e.g., for transmission via the network component 216 to a mobile device such as the mobile device 120 of FIG. 1, etc.) that indicates whether an equipment identifier tag in the image has a tag identifier that matches the target tag identifier and/or the text of tag identifier(s) determined from the image, whether to proceed or not proceed with the work order based on the image analysis, etc.

In examples where the image processing module 218 determines additional characteristics of the image (e.g., location, bar code(s), etc.), the text recognition module 222 compares these characteristics to known characteristics of the target equipment, and the indication of whether the equipment identifier tag in the image has a tag identifier that matches the target tag identifier is further based on the comparison of the additional determined characteristics with the known characteristics. While these characteristics are potentially unreliable when considered independently, these characteristics are usable by the text recognition module 222 along with validating the predicted tag identifier to further improve accurate identification of equipment.

In examples where the image processing module 218 selects a primary equipment identifier tag of two or more equipment identifier tags in an image, the text recognition module 222 performs text recognition and comparison on the recognized text for the sub-image that includes the primary equipment identifier tag. In some examples, in response to the primary equipment identifier tag being determined to not match a target equipment identifier tag, the text recognition module 222 performs further text recognition and comparison on the recognized text(s) for the sub-image(s) of equipment identifier tag(s) other than the primary equipment identifier tag. In various examples, the text recognition module 222 indicates which equipment identifier tag of two or more equipment identifier tags in an image correspond to the target equipment identifier tag.

Figure 3:
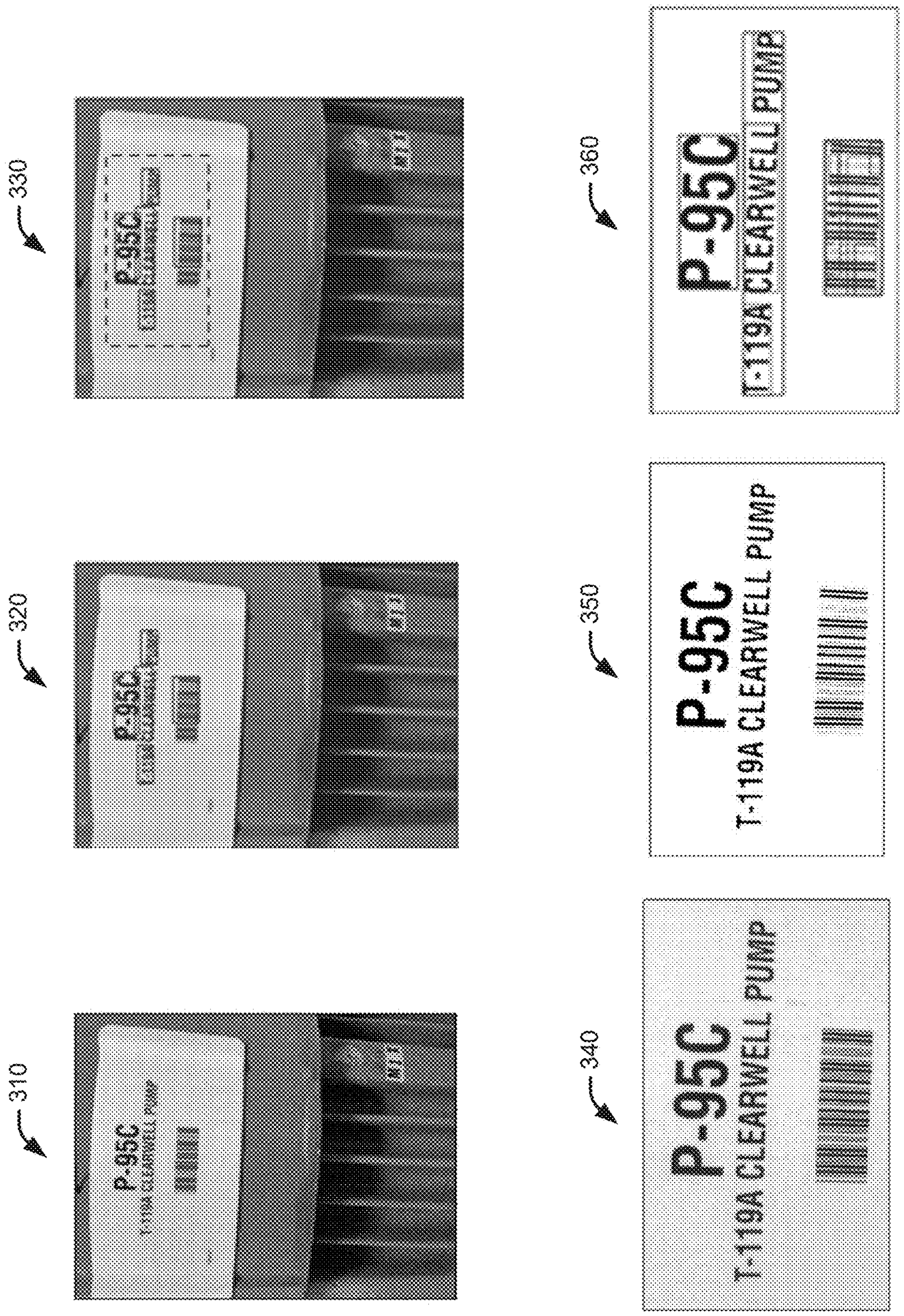
FIG. 3 illustrates a series of images showing an example flow for determining a tag identifier in an image of an equipment identifier tag.

Referring to FIG. 3, illustrated is a series of images 310-360 showing an example flow for determining a tag identifier in an image of an equipment identifier tag. From an initial image (not shown), a pre-processed image 310 is generated (e.g., via grayscaling in FIG. 3), such as by the image processing module 218 of FIG. 2. Text detection is performed on the pre-processed image 310 and bounding boxes around the identified text are determined (e.g., by the text detection module 220 of FIG. 2, etc.), as shown in the image 320. A clustering algorithm is applied (e.g., by the text detection module 220 of FIG. 2, etc.) to the recognized text based on the bounding box coordinates, as indicated via the dashed box around the recognized text in the image 330. The image is cropped (e.g., by the image processing module 218 of FIG. 2) to generate a sub-image 340 based on the clustered recognized text. Adaptive image processing is applied (e.g., by the image processing module 218 of FIG. 2) to the sub-image 340 to generate a processed sub-image 350. In the example of FIG. 3, binarization was applied (e.g., as selected by a trained machine learning algorithm employed such as by the image processing module 218 of FIG. 2) with parameters selected (e.g., by the trained machine learning algorithm employed to select the sub-image processing algorithm) to optimize text recognition on the processed sub-image 350. The sub-image 360 shows the binarized sub-image 350 with the bounding boxes from the text detection algorithm. The predicted words, their positions, and confidences of the predicted words are determined. In the example of FIG. 3, the tag identifier of P-95C is predicted, which is able to be compared with a target tag identifier from a work order, etc.

Figure 4:
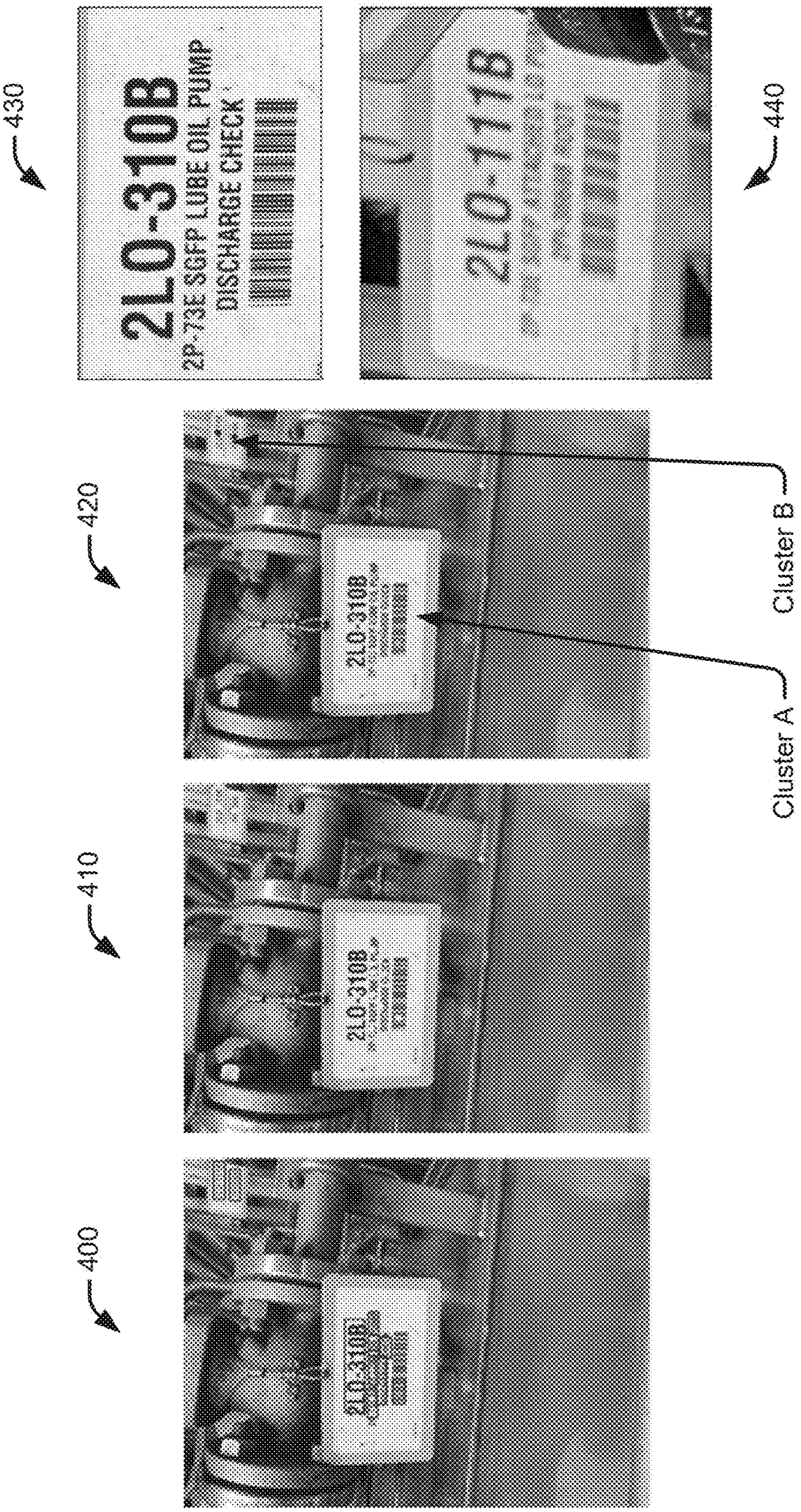
FIG. 4 illustrates a series of images of processing an example input image showing two equipment identifier tags

FIG. 4 shows a series of images 400-440 of processing an example input image showing two equipment identifier tags. The image 400 shows the result of text detection (e.g., by the text detection module 220 of FIG. 2, etc.) on the processed (e.g., by the image processing module 218 of FIG. 2, etc.) input image, with bounding boxes around the detected text. The image 410 shows circles representing each of the bounding boxes in the image 400, for determining clusters of recognized text (e.g., by the text detection module 220 of FIG. 2) via a clustering algorithm. As shown in the image 420, there are two clusters (cluster A and cluster B), one for each of the equipment identifier tags in the images 400-420. Each of the identified clusters of recognized text is cropped into sub-images (e.g., by the image processing module 218, etc.), providing the sub-image 430 (for cluster A) and the sub-image 440 (for cluster B). Although not shown in FIG. 4, various examples perform text recognition (e.g., via the text recognition module 222, etc.) on sub-images such as the sub-images 430 and 440.

Figure 5:
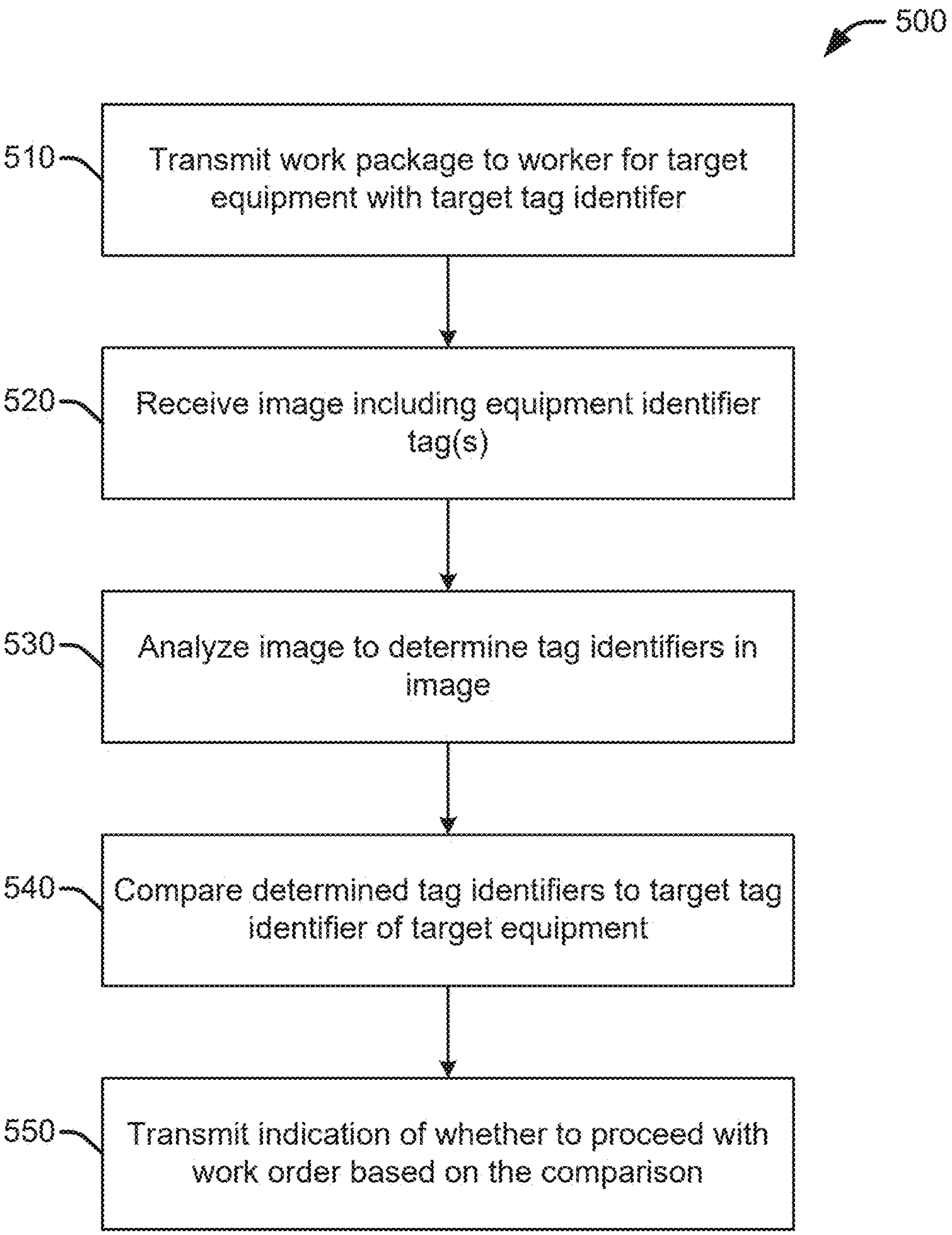
FIG. 5 illustrates a flowchart of an example method for verifying equipment in connection with a work order based on an image of an equipment identifier tag.
Figure 6:
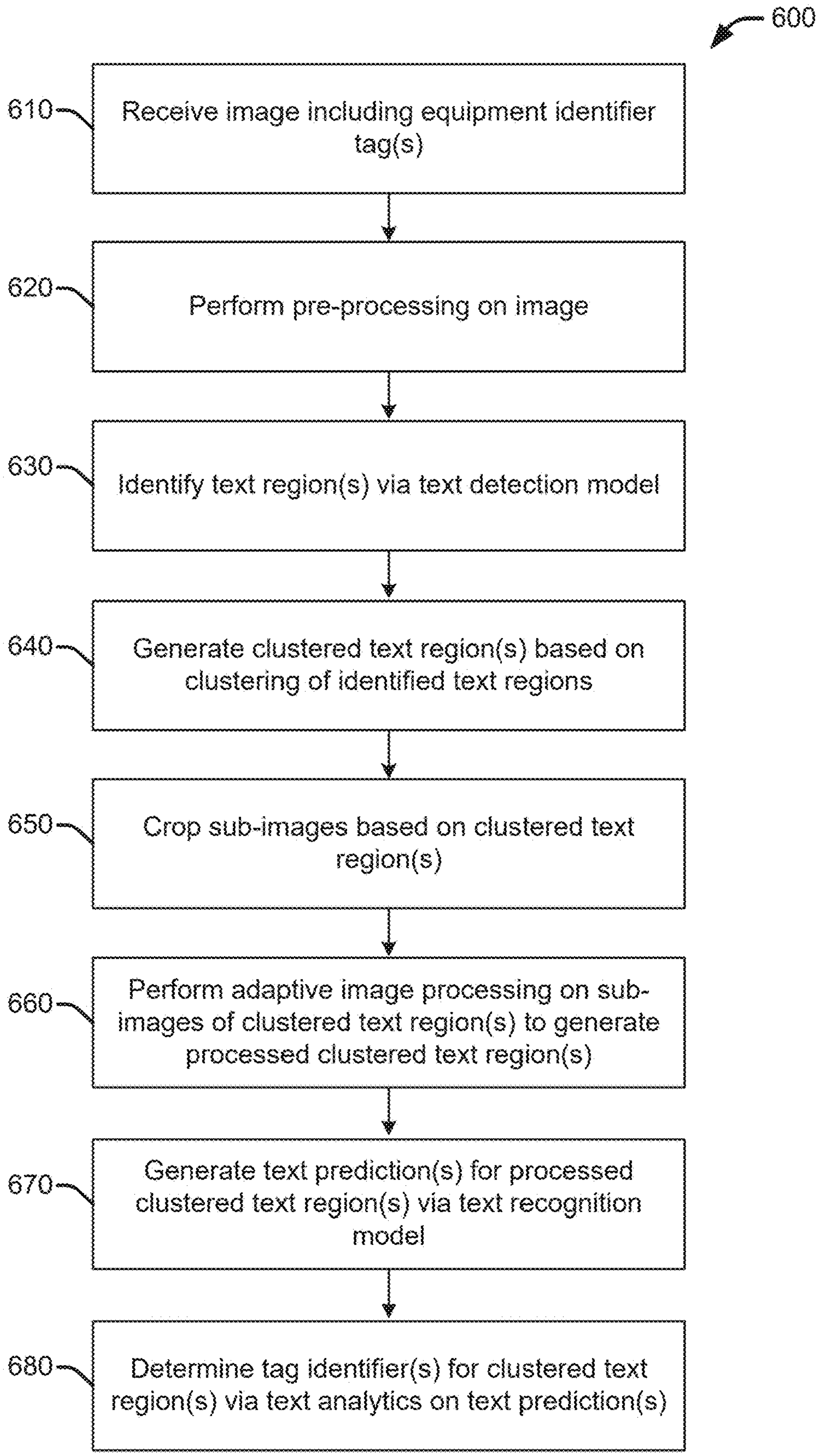
FIG. 6 illustrates a flowchart of an example method for determining one or more tag identifiers for an image of one or more equipment identifier tags.

In view of the foregoing structural and functional features described above, example methods will be better appreciated with reference to FIGS. 5 and 6. While, for purposes of simplicity of explanation, the example methods of FIGS. 5 and 6 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 5 illustrates a flowchart of an example method 500 for verifying equipment in connection with a work order based on an image of an equipment identifier tag. In other examples, the blocks of example method 500 are a set of machine-readable instructions on a non-transitory machine-readable medium or are a set of operations performed by a processor executing machine-readable instructions as the operations.

At block 510, the method 500 includes transmitting a work package to a worker for work (e.g., maintenance, etc.) on a target equipment with a target tag identifier. At block 520, the method 500 includes receiving an image including one or more equipment identifier tags, such as from a mobile device of the worker.

At block 530, the method 500 includes analyzing the image (e.g., via equipment verification system 202, etc.) to determine tag identifier(s) within the image. At block 540, the method 500 includes comparing (e.g., via text recognition module 222, etc.) the determined tag identifier(s) from the image with a target tag identifier of the target equipment of the work order. At block 550, the method 500 includes transmitting an indication of whether to proceed with the work order based on the comparison at block 540 (e.g., authorizing the work order based on a condition such as when a tag identifier in the image: matches the target tag identifier, has a similarity score relative to the target tag identifier above similarity scores relative to other tag identifiers of a set of tag identifiers, has a similarity score relative to the target tag identifier above a threshold, etc.; not authorizing the work order if such a condition is unmet).

FIG. 6 illustrates a flowchart of an example method 600 for determining one or more tag identifiers for an image of one or more equipment identifier tags. In other examples, the blocks of example method 600 are a set of machine-readable instructions on a non-transitory machine-readable medium or are a set of operations performed by a processor executing machine-readable instructions as the operations.

At block 610, the method 600 includes receiving an image that includes one or more equipment identifier tags. At block 620, the method 600 includes performing pre-processing on the image (e.g., via the image processing module 218, etc.).

At block 630, the method 600 includes identifying one or more text regions via a text detection model (e.g., a trained machine learning algorithm employed by the text detection module 220, etc.) and generating bounding boxes with associated coordinates for the identified text regions. At block 640, the method 600 includes generating one or more clustered text region(s) based on applying a clustering algorithm (e.g., via the text detection module 220, etc.) to the identified text regions (e.g., based on proximally close bounding box coordinates).

At block 650, the method 600 includes cropping sub-images (e.g., via the image processing module 218, etc.) from the image based on the clustered text region(s), generating a sub-image for each clustered text region. At block 660, the method 600 includes performing adaptive image processing on the sub-images (e.g., via image processing module 218 of FIG. 2 employing a trained machine learning algorithm to select an image processing algorithm and associated parameters for optimal image processing of the sub-image, etc.) for the clustered text region(s), generating processing clustered text region(s). At block 670, method 600 includes generating text prediction(s) (e.g., via the text recognition module 222 of FIG. 2, etc.) for the processed clustered text region(s) of each sub-image.

At block 680, the method 600 includes determining a tag identifier for each sub-image by applying text analytics (e.g., via the text recognition module 222 of FIG. 2, etc.) on the text prediction(s) of block 670. In various examples, the determined tag identifier(s) are compared (e.g., via the text recognition module 222, etc.) to a set of tag identifiers (e.g., of a tag identifier database 204) and/or a target tag identifier of a work order (e.g., as in block 540 of FIG. 5, etc.).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term “includes” means includes but not limited to, the term “including” means including but not limited to. The term “based on” means based at least in part on. Also as used herein, the term “set” means one or more elements (e.g., where the elements can be anything, such as datasets, nodes, relationships, etc.), and a “subset” of a set A refers to any set B where every element of set B is an element of set A (note that every set A is a subset of itself, as every element of set A is an element of set A). Additionally, where the disclosure or claims recite “a,” “an,” “a first,” or “another” element, or the equivalent thereof, it should be interpreted to include one or more than one such element, neither requiring nor excluding two or more such elements.

In this description, unless otherwise stated, “about,” “approximately” or “substantially” preceding a parameter means being within +/−10 percent of that parameter. Modifications are possible in the described embodiments, and other embodiments are possible, within the scope of the claims.

What is claimed is:

1. A non-transitory machine-readable medium having machine executable instructions for an equipment verification system that causes a processor core to execute operations, the operations comprising:

receiving an image comprising an equipment identifier tag;

identifying a set of text regions in the image;

generating a clustered text region associated with the equipment identifier tag from the set of text regions, wherein the clustered text region comprises a subset of the set of text regions;

adaptively applying an image processing algorithm to a sub-image of the image to generate a processed clustered text region, wherein the sub-image comprises the clustered text region and the image processing algorithm is selected from a set of image processing algorithms based on the sub-image;

generating a predicted tag identifier for the processed clustered text region;

determining a tag identifier for the equipment identifier tag based on a comparison between the predicted tag identifier for the processed clustered text region and a set of tag identifiers comprising the tag identifier;

determining whether the tag identifier is a target tag identifier associated with a work order for maintenance of target equipment having the target tag identifier; and transmitting an indication of whether to proceed with the work order based on whether the tag identifier is the target tag identifier.

2. The non-transitory machine-readable medium of claim 1, wherein a text region of the set of text regions has associated bounding box coordinates for the text region, and wherein the clustered text region is generated based on proximity between bounding box coordinates of the text region of the subset of the set of text regions.

3. The non-transitory machine-readable medium of claim 1, wherein the image processing algorithm is selected by a machine learning model trained using a training set of sub-images, and wherein the machine learning model is trained to select parameters for applying the image processing algorithm to the sub-image to improve text recognition in generating the processed clustered text region.

4. The non-transitory machine-readable medium of claim 1, wherein the set of image processing algorithms comprises a binary thresholding algorithm and a grayscale algorithm.

5. The non-transitory machine-readable medium of claim 1, wherein the comparison comprises determining a similarity score between the predicted tag identifier and the tag identifier.

6. The non-transitory machine-readable medium of claim 1, wherein generating the predicted tag identifier comprises:

generating a text prediction for the processed clustered text region; and filtering the text prediction to determine the predicted tag identifier.

7. The non-transitory machine-readable medium of claim 1, wherein the image comprises an additional equipment identifier tag, the operations further comprising:

generating an additional clustered text region associated with the additional equipment identifier tag from the set of text regions;

adaptively applying an additional image processing algorithm to an additional sub-image of the image to generate an additional processed clustered text region, wherein the additional sub-image comprises the additional clustered text region and the additional image processing algorithm is selected from the set of image processing algorithms based on the sub-image;

generating an additional predicted tag identifier for the additional processed clustered text region; and determining an additional tag identifier for the additional equipment identifier tag based on a comparison between the additional predicted tag identifier for the additional processed clustered text region and a set of tag identifiers comprising the additional tag identifier.

8. The non-transitory machine-readable medium of claim 1, wherein the image comprises an additional equipment identifier tag, the operations further comprising:

generating an additional clustered text region associated with the additional equipment identifier tag from the set of text regions;

adaptively applying an additional image processing algorithm to an additional sub-image of the image to generate an additional processed clustered text region, wherein the additional sub-image comprises the additional clustered text region and the additional image processing algorithm is selected from the set of image processing algorithms based on the sub-image; and selecting the sub-image for comparison with the set of tag identifiers based on a property of the sub-image and an additional property of the additional sub-image.

9. The non-transitory machine-readable medium of claim 1, wherein determining the tag identifier for the equipment identifier tag is further based on at least one of a property of the image or a property of the equipment identifier tag.

10. The non-transitory machine-readable medium of claim 1, wherein generating the predicted tag identifier is further based on user feedback.

11. The non-transitory machine-readable medium of claim 1, wherein identifying the set of text regions in the image comprises employing a trained machine learning algorithm to identify the set of text regions.

12. An equipment verification system, comprising:

a memory for storing machine-readable instructions; and a processor core for accessing the machine-readable instructions and executing the machine-readable instructions as operations, the operations comprising:

receiving an image comprising an equipment identifier tag;

identifying a set of text regions in the image;

generating a clustered text region associated with the equipment identifier tag from the set of text regions, wherein the clustered text region comprises a subset of the set of text regions;

adaptively applying an image processing algorithm to a sub-image of the image to generate a processed clustered text region, wherein the sub-image comprises the clustered text region and the image processing algorithm is selected from a set of image processing algorithms based on the sub-image;

generating a predicted tag identifier for the processed clustered text region;

determining a tag identifier for the equipment identifier tag based on a comparison between the predicted tag identifier for the processed clustered text region and a set of tag identifiers comprising the tag identifier;

determining whether the tag identifier is a target tag identifier associated with a work order for maintenance of target equipment having the target tag identifier; and transmitting an indication of whether to proceed with the work order based on whether the tag identifier is the target tag identifier.

13. The equipment verification system of claim 12, wherein a text region of the set of text regions has associated bounding box coordinates for the text region, and wherein the clustered text region is generated based on proximity between bounding box coordinates of the text region of the subset of the set of text regions.

14. The equipment verification system of claim 12, wherein the sub-image is generated based on cropping the image to comprise the subset of the set of text regions.

15. The equipment verification system of claim 12, wherein the image comprises an additional equipment identifier tag, the operations further comprising:

generating an additional clustered text region associated with the additional equipment identifier tag from the set of text regions;

adaptively applying an additional image processing algorithm to an additional sub-image of the image to generate an additional processed clustered text region, wherein the additional sub-image comprises the additional clustered text region and the additional image processing algorithm is selected from the set of image processing algorithms based on the sub-image;

generating an additional predicted tag identifier for the additional processed clustered text region; and determining an additional tag identifier for the additional equipment identifier tag based on a comparison between the additional predicted tag identifier for the additional processed clustered text region and a set of tag identifiers comprising the additional tag identifier.

16. A method for equipment verification, the method comprising:

receiving an image comprising an equipment identifier tag;

identifying a set of text regions in the image;

generating a clustered text region associated with the equipment identifier tag from the set of text regions, wherein the clustered text region comprises a subset of the set of text regions;

adaptively applying an image processing algorithm to a sub-image of the image to generate a processed clustered text region, wherein the sub-image comprises the clustered text region and the image processing algorithm is selected from a set of image processing algorithms based on the sub-image;

generating a predicted tag identifier for the processed clustered text region;

determining a tag identifier for the equipment identifier tag based on a comparison between the predicted tag identifier for the processed clustered text region and a set of tag identifiers comprising the tag identifier;

determining whether the tag identifier is a target tag identifier associated with a work order for maintenance of target equipment having the target tag identifier; and transmitting an indication of whether to proceed with the work order based on whether the tag identifier is the target tag identifier.

17. The method of claim 16, wherein the image comprises an additional equipment identifier tag, the method further comprising:

generating an additional clustered text region associated with the additional equipment identifier tag from the set of text regions;

adaptively applying an additional image processing algorithm to an additional sub-image of the image to generate an additional processed clustered text region, wherein the additional sub-image comprises the additional clustered text region and the additional image processing algorithm is selected from the set of image processing algorithms based on the sub-image;

generating an additional predicted tag identifier for the additional processed clustered text region; and determining an additional tag identifier for the additional equipment identifier tag based on a comparison between the additional predicted tag identifier for the additional processed clustered text region and a set of tag identifiers comprising the additional tag identifier.

18. The non-transitory machine-readable medium of claim 1, wherein the image comprises an additional equipment identifier tag associated with an additional sub-image, the operations further comprising:

selecting the sub-image for comparison with the set of tag identifiers based on a property of the sub-image and an additional property of the additional sub-image.

19. The non-transitory machine-readable medium of claim 1, wherein the image comprises an additional equipment identifier tag associated with an additional sub-image, the operations further comprising:

generating an additional predicted tag identifier for the additional equipment identifier tag; and determining an additional tag identifier for the additional equipment identifier tag based on a comparison between the additional predicted tag identifier for the additional equipment identifier tag and a set of tag identifiers comprising the additional tag identifier.

20. The non-transitory machine-readable medium of claim 1, the operations further comprising:

determining an additional characteristic of the image comprising at least one of (i) location metadata, (ii) a bar code, or (iii) an outline of equipment associated with the equipment identifier tag; and comparing the additional characteristic to a target characteristic of the target equipment, wherein determining the tag identifier for the equipment identifier tag is further based on the comparison of the additional characteristic with the target characteristic.

* * * * *